United States Patent [19]

Kranz

[11] Patent Number: 5,468,439
[45] Date of Patent: Nov. 21, 1995

[54] PROCESS FOR MANUFACTURING FINITE EXTRUDED PROFILES

[75] Inventor: Jurgen Kranz, Lindau, Germany

[73] Assignee: Metzeler Automotive Profiles GmbH, Lindau Bodensee, Germany

[21] Appl. No.: 230,819

[22] Filed: Apr. 21, 1994

[30] Foreign Application Priority Data

Apr. 22, 1993 [DE] Germany ............... 43 13 194.8

[51] Int. Cl.[6] ..................................................... B26F 1/24
[52] U.S. Cl. ............... 264/145; 156/244.18; 156/244.25; 264/151; 264/167; 264/177.18; 425/291; 425/309; 425/316
[58] Field of Search ............... 264/167, 210.2, 264/177.1, 280, 177.16–177.20, 156, 154, 148–149, 145, 146, 151; 425/290, 291, 315, 316, 309; 156/244.18, 244.25

[56] References Cited

U.S. PATENT DOCUMENTS

| | | | |
|---|---|---|---|
| 3,744,947 | 7/1973 | Skobel | 264/149 |
| 3,830,610 | 8/1974 | Ohkawa et al. | 425/381 |
| 4,341,727 | 7/1982 | Landsness et al. | 264/145 |
| 4,419,315 | 12/1983 | Kessler | 264/145 |
| 4,534,724 | 8/1985 | Fischer et al. | 425/315 |
| 4,584,150 | 4/1986 | Ballocca | 264/167 |
| 4,765,936 | 8/1988 | Ballocca | 264/177.1 |
| 4,851,067 | 7/1989 | Ogawa et al. | 264/177.17 |
| 4,861,530 | 8/1989 | Zaccaria | 264/167 |
| 4,904,434 | 2/1990 | Hyer | 264/148 |

FOREIGN PATENT DOCUMENTS

| | | | |
|---|---|---|---|
| 0081093 | 3/1985 | European Pat. Off. | |
| 1179358 | 8/1967 | Germany. | |
| 2611931 | 9/1977 | Germany | 425/290 |
| 8219073 | 10/1986 | Germany. | |
| 59-70528 | 4/1984 | Japan | 425/381 |
| 4-18333 | 1/1992 | Japan | 264/148 |
| 4-08526 | 1/1992 | Japan | 264/148 |
| 4-52121 | 2/1992 | Japan | 264/210.2 |

*Primary Examiner*—Jeffery R. Thurlow
*Attorney, Agent, or Firm*—Cumpston & Shaw

[57] ABSTRACT

In a process for manufacturing finite extruded profiles (3) from elastomer material with at least one projecting sealing lip (12) of different contour (32) over the length of the profile, for simple and very accurate manufacture the invention proposes that by means of two needles (10, 11) which act laterally on the sealing lip (12) and whose depth of contact (a) is controlled by a cam disk (5), the specified contour configuration (32) in the corresponding profile area (12) is incised in the form of grooves and the projecting profile section (38) severed after vulcanization (FIG. 1).

9 Claims, 2 Drawing Sheets

PROCESS FOR MANUFACTURING FINITE EXTRUDED PROFILES

The invention relates to a process for manufacturing finite extruded profiles from elastomer material with at least one projecting sealing lip of different contour over the length of the profile, the sealing lip being extruded with maximum cross-section and then reduced to the specified contour configuration.

It is known to manufacture extruded profiles with projecting sealing lips of different length over the area of the extruded profile. In this connection it is known from EP-B-0081093 to cover the profile cross-section of the die on the extruder with a screen intermittently and over partial areas so that only a profile of the desired configuration is then extruded.

Furthermore it is known from DE-U-8219073.9 to sever sealing lip areas projecting after extrusion with a cutting knife that can be moved obliquely to the profile so that the desired configuration is obtained here also.

A disadvantage of such an arrangement is that in this case the cutting knife exerts a lateral pressure on the still unvulcanized profile, which can cause an additional deformation of the remaining profile areas. Furthermore, the accuracy of the cut edge in such an arrangement leaves something to be desired.

In contrast, the object of the invention is to create a process for manufacturing such extruded profiles with sealing lips of differing length in which no additional deformation of the unvulcanized profile occurs and in which a very clean cut edge is obtained in particular.

To achieve this object the invention proposes that by means of two needles which act laterally on the sealing lip and whose depth of contact is controlled by a cam disk, the specified contour configuration in the corresponding profile area is incised in the form of grooves and the projecting profile section severed after vulcanization.

This enables an accurately guided partial cut from both sides of the sealing lip to be made in it, it then being possible to sever the projecting area after vulcanization in a simple manner.

Furthermore it is possible for vertical incisions to be made in the profile according to a specified length of an extruded profile by means of indexer projections on the cam disk and the continuous extruded profile then to be severed into finite extruded profiles at these incisions.

In further development of the invention, in a device for implementing this process according to the invention it is proposed that two hard metal needles running at an angle to each other are arranged in a variator arranged upstream of the die of the extruder in a vertically movable manner and that the variator spring-loaded via a vertical ram is in active connection with a cam disk reproducing the specified contour of the corresponding profile area.

It is appropriate for the variator to be fixed directly on the die of the extruder.

The rotational speed of the cam disk can be controlled according to a measuring wheel determining the take-off speed of the extruded profile.

In a further embodiment it is advantageous if a vulcanization section and then two stripping rollers for severing the profile section which projects and has been incised by the hard metal needles are installed downstream of the variator.

One cycle of the cam disk should correspond to the length of a finite extruded profile and the eccentric disk should have indexer projections on its circumference whose corresponding impressions on the extruded profile can be read by a light barrier downstream of the stripping rollers, the signal from which can be evaluated to control an adjacent length-cutting device.

BRIEF DESCRIPTION OF THE DRAWINGS

The construction and mode of operation of an embodiment of the invention are described in greater detail with the aid of a diagrammatic drawing, in which.

Figure 1:
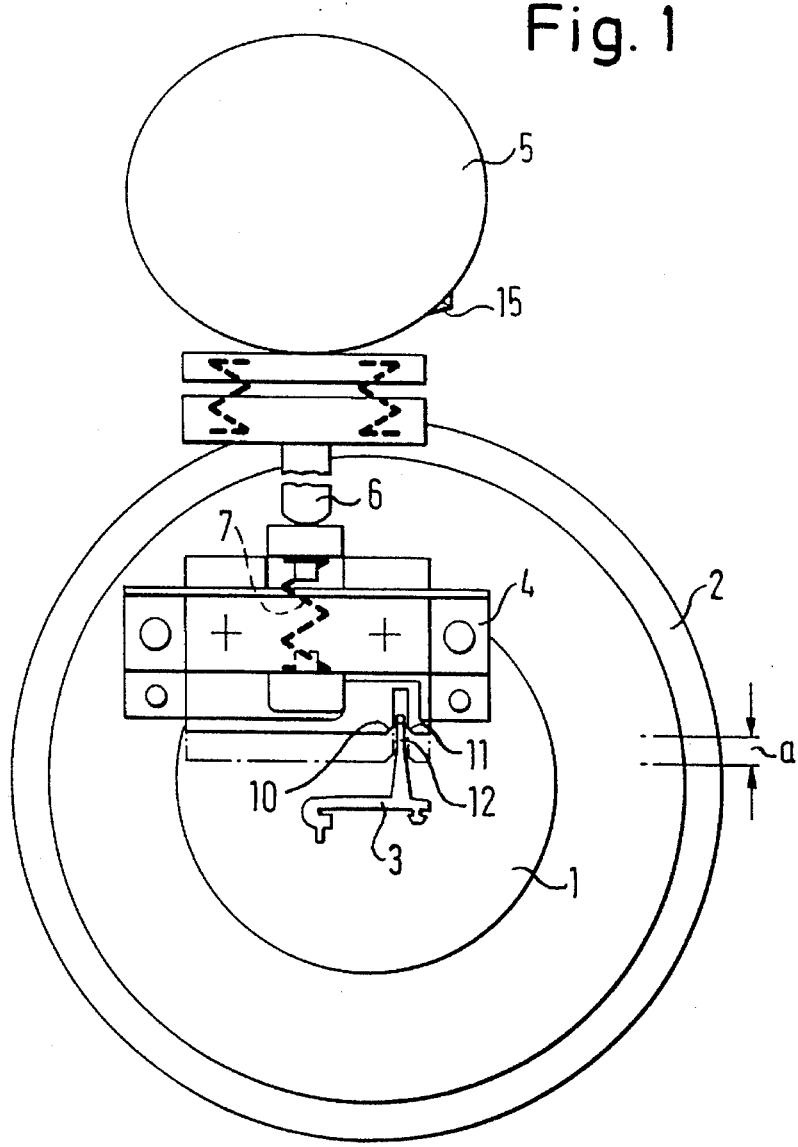
FIG. 1 shows a top view onto the die of the extruder with cam disk and variator in front.
Figure 2:
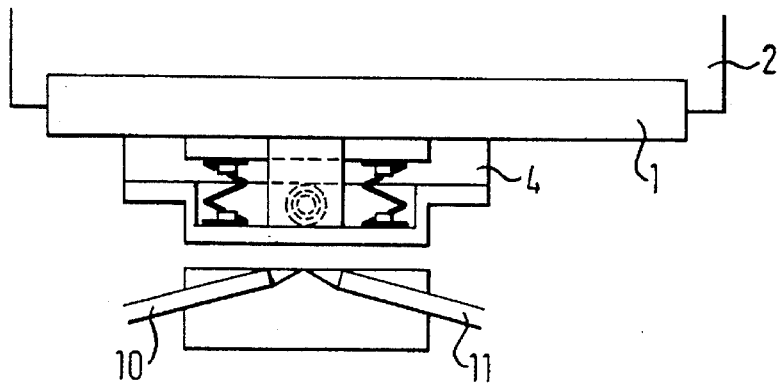
FIG. 2 shows a view onto this device from above.

As can be seen from FIGS. 1 and 2, immediately in front of the die 1 of the extruder 2, with which a profile 3 of the cross-section given, for example, is to be extruded, is arranged a variator 4, whose moving part can be moved vertically against the resistance of a spring 7 by means of a rotating cam disk 5 and an intermediate ram 6.

As can be seen from FIGS. 1 and 2, the variator has two steel needles 10 and 11 set at an angle to each other, the tips of which act laterally on the upwards-projecting sealing lip 12 of the profile 3 and make corresponding incisions there without totally severing the sealing lip.

As can be seen from FIG. 1, the variator 4 and hence the needles 10 and 11 can be varied in terms of its height within the distance a according to the eccentricity of the cam disk, in order to apply corresponding incisions of variable depth to the sealing lip 12.

Furthermore, the cam disk 5 has on its circumference an indexer projection 15 with which, after every cycle of the cam disk 5 which corresponds to the length of an extruded profile to be severed, a vertical notching takes place in the sealing lip 12, at which place the continuous extruded profile is divided into individual finite profiles in a way still to be described.

Figure 3:
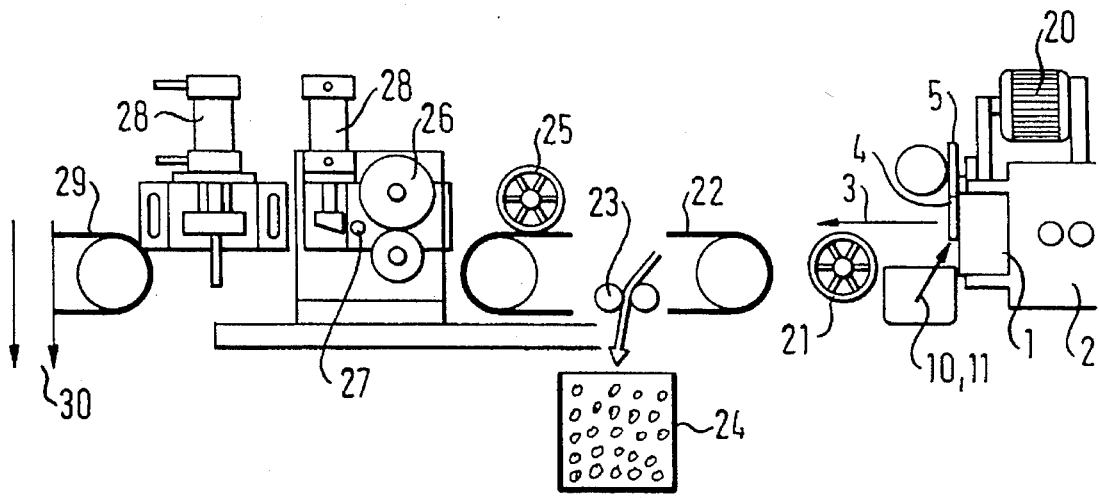
FIG. 3 is a diagrammatic general view of the treatment section for the profile.

FIG. 3 shows the construction of the entire treatment section in diagrammatic form. The profile 3 shown in diagrammatic form is extruded from the die 1 of the extruder 2. The variator 4 and the cam disk 5, the latter being driven by a motor 20, are arranged on the die 1. The electrical signals required for the rotational speed of the cam disk according to the take-off speed of the profile 3 are provided by the downstream measuring wheel 21.

The vulcanization section 22, at the end of which the profile area 38 pre-cut by the needles 10 and 11 is severed via stripping rollers 23 and collected in a waste container 24, is downstream of this part of the treatment section.

The measuring wheel 25 further downstream determines the sag of the extruded profile for the length-cutting device which is described below.

First of all the profile 3 is grasped by the insert rollers 26 and conveyed to a light barrier 27 which detects the incisions set by the indexer 15 and converts into corresponding commands to the subsequent actual length-cutting device 28, which is subsequently also shown in a front view, in order to sever the endless extruded profile 3 in the indexer area in each case into finite extruded profiles which are then conveyed to a collecting container 30 via a belt 29.

Figure 4:
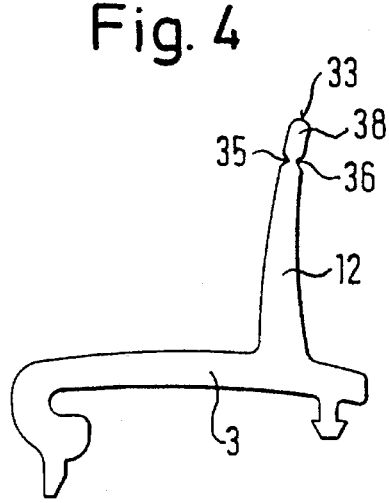
FIG. 4 shows the cross-section of a possible profile.
Figure 5:
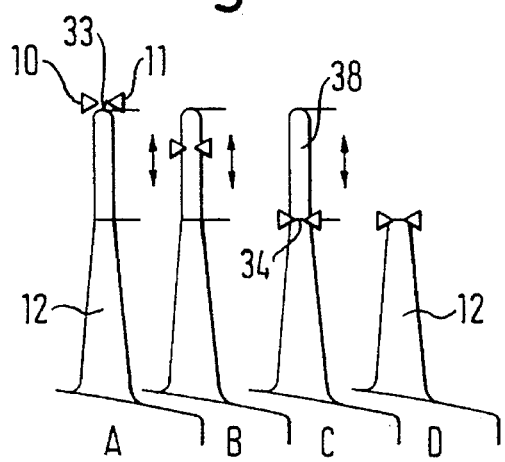
FIG. 5 shows a diagrammatic view of the mode of operation of the cutting needles and FIG. 6 shows a diagrammatic side view of a section of the endless extruded profile.

FIG. 4 shows the cross-section of a profile 3 which is to be manufactured, for example, with a projecting sealing lip 12. Over its length this sealing lip 12 should have the top edge configuration 32 shown greatly exaggerated in FIG. 6. For this purpose, according to the diagrammatic drawing in FIG. 5, the needles 10 and 11 are brought from the extruded top edge 33 of the sealing lip 12—according to the configuration of the eccentric disk 5—via an intermediate position according to FIG. 5B into the lower end position 34 according to FIG. 5C and cut corresponding grooves 35 and 36 in the sealing lip 12 on both sides according to the inclination of the top edge configuration 32, these grooves, later foaming the stripping edges in the stripping rollers 23.

FIG. 5D shows the further configuration of the profile with required shortened sealing lip 12.

Figure 6:
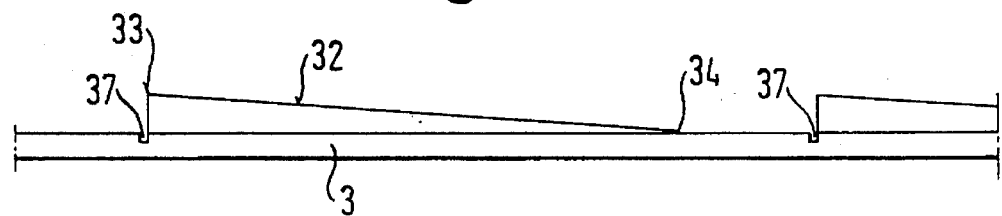

Over and above this, the incisions 37 made by the indexer projection 15, at which the endless extruded profile is then divided into individual finite extruded profiles can be identified in the diagrammatic view according to FIG. 6.

With the process described and the corresponding device it is therefore possible to manufacture an extruded profile with a sealing lip height that is different over its length. The essential point is that a profile edge that is broken from both sides can be created with the process described because such broken edges have a very good tightness with respect to paints and plastics and good sliding properties without any wear occurring.

In this case the purpose of the profile shown in cross-section is to seal a motor vehicle door frame with respect to the roof. Other forms and applications of profiles to be treated correspondingly are, however, conceivable in the context of the invention.

I claim:

1. Process for manufacturing finite extruded profiles from elastomer material with at least one projecting sealing lip of different contour over the length of the profile, the sealing lip being extruded with maximum cross-section and then reduced to the specified contour configuration comprising the steps of:

incising grooves in the sealing lip by contacting the lip with two needles which act laterally on the sealing lip;

controlling the depth of contact (a) by a cam disk, the specified contour configuration in the corresponding profile area being incised in the form of grooves;

vulcanizing the profiles; and severing the projecting profile section after vulcanization.

2. Process according to claim 1, comprising making vertical incisions in the profile according to a specified length of an extruded profile by contacting the profile with indexer-projections on the cam disk contacting the profile; and severing the continuous extruded profile into finite extruded profiles at the vertical incisions.

3. Device for manufacturing an extruded profile having a profile area that changes along the length of the profile comprising:

an extrusion die;

two hard metal needles disposed at an angle to each other and arranged in a variator disposed downstream of the extrusion die in a vertically movable manner and a vertical ram, the variator being vertically movable via the said ram and in active connection with a cam disk and shaped to produce a specified contour of the profile area.

4. Device according to claim 3, in which the variator is fixed directly on the extrusion die.

5. Device according to claim 3, comprising a measuring wheel for determining the take off speed of the extruded profile and coupled to the cam disk for controlling the rotational speed of the cam disk.

6. Device according to claim 3, comprising a vulcanization section downstream of the variator and then two stripping rollers for severing the profile section which projects and has been incised by the hard metal needles.

7. Device according to claim 3, in which one cycle of the cam disk corresponds to the length of a finite extruded profile and the cam disk comprises an indexer projection on its circumference engaging the profile to form impressions on the extruded profile which can be read by a light barrier downstream of the stripping rollers a signal from which can be evaluated to control an adjacent, length-cutting device.

8. Process for manufacturing finite extruded profiles from elastomer material with at least one projecting sealing lip of different contour over the length of the profile, the sealing lip being extruded with a maximum cross section and then reduced to the specified contoured configuration comprising:

incising grooves in the sealing lip by means of two needles which act laterally on the sealing lips;

controlling the depth of contact by a cam disk, the specified contoured configuration in the corresponding profile area being incised in the form of grooves;

making vertical incisions in the profile according to a specified length of an extruded profile by means of indexer projections on the cam disk contacting the profile; and severing the projecting profile section after vulcanization.

9. A process for manufacturing finite extruded profiles from elastomer material with at least one projecting sealing lip of different contour over the length of the profile, the sealing lip being extruded with maximum cross section and then reduced to the specified contour configuration comprising:

incising grooves in the sealing lip by means of two needles which act laterally on the sealing lip;

controlling the depth of contact by a cam disk, the specified contour configuration in the corresponding profile being incised in the form of grooves; and contacting the profile with indexer projections on the cam disk for forming impressions on the extruded profile which can be read by a light barrier to generate a signal which can be evaluated to control an adjacent length cutting device.

* * * * *